US00RE48138E

(19) United States
(12) Reissued Patent
Ibrahim et al.

(10) Patent Number: US RE48,138 E
(45) Date of Reissued Patent: Aug. 4, 2020

(54) ELECTRICALLY REGENERATABLE FILTER ELEMENT

(71) Applicant: Rypos, Inc., Franklin, MA (US)

(72) Inventors: Osama M Ibrahim, Charlotte, NC (US); Klaus J Peter, Natick, MA (US); Willy Marrecau, Rome, GA (US); Koen Wastijn, Deerlijk (BE); Geert Devooght, Koekelare (BE)

(73) Assignee: Rypos, Inc., Franklin, MA (US)

(21) Appl. No.: 16/295,278

(22) Filed: Mar. 7, 2019

Related U.S. Patent Documents

Reissue of:
(64) Patent No.: 7,267,703
Issued: Sep. 11, 2007
Appl. No.: 10/466,120
Filed: Jan. 31, 2002

U.S. Applications:
(60) Provisional application No. 60/265,907, filed on Feb. 5, 2001.

(51) Int. Cl.
*B01D 46/24* (2006.01)
*F01N 13/00* (2010.01)
(Continued)

(52) U.S. Cl.
CPC ..... *B01D 46/2403* (2013.01); *B01D 46/0078* (2013.01); *B01D 46/521* (2013.01); *F01N 3/027* (2013.01); *F01N 3/0217* (2013.01); *F01N 3/0226* (2013.01); *F01N 3/031* (2013.01); *F01N 13/0097* (2014.06); *F01N 13/017* (2014.06); *F01N 13/14* (2013.01); *B01D 2271/02* (2013.01); *B01D 2275/10* (2013.01);
(Continued)

(58) Field of Classification Search
CPC ..... B01D 46/2403; B01D 46/521; B01D 46/0078; B01D 2275/10; B01D 2279/30; B01D 2271/02; F01N 3/027; F01N 13/14; F01N 3/0217; F01N 3/0226; F01N 3/031; F01N 13/0097; F01N 13/017; F01N 2450/28; F01N 2260/10; F01N 2330/14; F01N 2330/10; Y10S 55/10; Y10S 55/30
See application file for complete search history.

(56) References Cited

U.S. PATENT DOCUMENTS 3,857,688 A * 12/1974 Wisnewski ..... 55/483
4,199,387 A 4/1980 Hladik
(Continued)

FOREIGN PATENT DOCUMENTS

WO WO97/04152 A1 2/1997
WO WO 00/00721 * 1/2001
(Continued)

*Primary Examiner* — Jerry D Johnson
(74) *Attorney, Agent, or Firm* — James Ernstmeyer

(57) ABSTRACT

An electrically regeneratable filter element comprises at least two flanks, each of these flanks comprising a stiff material layer. Each of these flanks has at least one thermally and electrically insulated side. The filter element comprises further a metal fiber fleece being pleated according to pleating lines providing an edge with pleat openings. The metal fiber fleece is mounted between the flanks, in such a way that the thermally and electrically insulated sides make contact with the edge, meanwhile these sides closing the pleat openings.

18 Claims, 8 Drawing Sheets

(51) Int. Cl.

| | |
|---|---|
| ***B01D 46/00*** | (2006.01) |
| ***B01D 46/52*** | (2006.01) |
| ***F01N 3/021*** | (2006.01) |
| ***F01N 3/022*** | (2006.01) |
| ***F01N 3/027*** | (2006.01) |
| ***F01N 3/031*** | (2006.01) |
| ***F01N 13/14*** | (2010.01) |

(52) U.S. Cl.
CPC ..... *B01D 2279/30* (2013.01); *F01N 2260/10* (2013.01); *F01N 2330/10* (2013.01); *F01N 2330/14* (2013.01); *F01N 2450/28* (2013.01); *Y10S 55/10* (2013.01); *Y10S 55/30* (2013.01)

(56) References Cited

U.S. PATENT DOCUMENTS

| | | | | |
|---|---|---|---|---|
| 4,687,579 | A | 8/1987 | Bergman | |
| 5,395,039 | A * | 3/1995 | Koehler et al. | 210/496 |
| 5,454,845 | A * | 10/1995 | Anahara et al. | 55/523 |
| 5,709,722 | A | 1/1998 | Nagai et al. | |
| 5,733,452 | A * | 3/1998 | Whitlock | 55/523 |
| 5,800,790 | A * | 9/1998 | Imamura et al. | 422/174 |
| 5,853,437 | A | 12/1998 | Peter | |
| 6,063,150 | A | 5/2000 | Peter | |
| 6,090,172 | A * | 7/2000 | Dementhon et al. | 55/282.3 |
| 6,120,583 | A * | 9/2000 | Saito et al. | 55/283 |
| 6,176,896 | B1 * | 1/2001 | Dementhon et al. | 55/282.3 |
| 6,572,682 | B2 * | 6/2003 | Peter et al. | 55/282.3 |
| 6,991,672 | B2 * | 1/2006 | Marrecau et al. | 55/282.3 |
| 6,991,673 | B2 * | 1/2006 | Wastijn et al. | 55/282.3 |
| 7,001,449 | B2 * | 2/2006 | Wastijn et al. | 55/282.3 |
| 2004/0040268 | A1 | 3/2004 | Wastijn et al. | |
| 2004/0050022 | A1 | 3/2004 | Marrecau et al. | |
| 2004/0050023 | A1 | 3/2004 | Wastijn et al. | |

FOREIGN PATENT DOCUMENTS

| | | | |
|---|---|---|---|
| WO | WO 01/00971 | A1 | 1/2001 |
| WO | WO 02/057000 | A1 | 7/2002 |

* cited by examiner

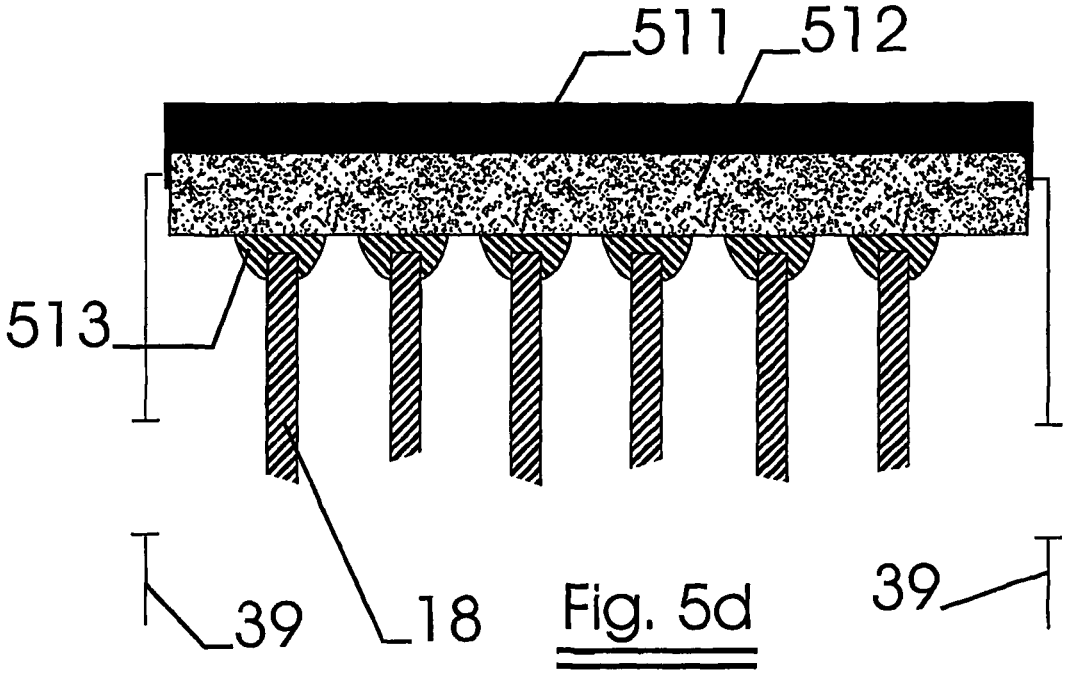
Fig. 5d
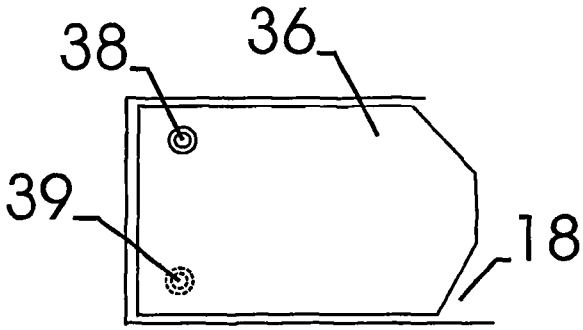
Fig. 6
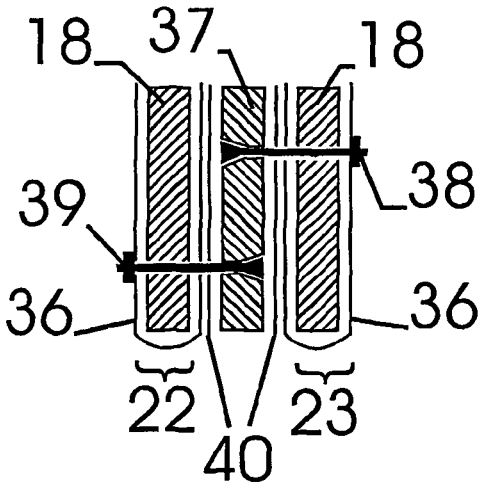

ELECTRICALLY REGENERATABLE FILTER ELEMENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCES TO RELATED APPLICATIONS*

*The present application is a reissue application of U.S. Pat. No. 7,267,703, issued on Sep. 11, 2007, which issued on U.S. patent application Ser. No. 10/466,120, which entered the national stage on Sep. 4, 2003. U.S. patent application Ser. No. 10/466,120 is a national stage entry of International Patent Application No. PCT/EP02/01158, filed Jan. 31, 2001, which prior application claims the benefit of U.S. Provisional Application No. 60/265,907, filed Feb. 5, 2001.*

FIELD OF THE INVENTION

The present invention relates to filter elements, which may be regenerated electrically. More specific, the invention relates to filter elements for filtering diesel exhaust gasses.

BACKGROUND OF THE INVENTION

Diesel soot particulate traps comprising pleated metal fiber fleece are, known, e.g. from U.S. Pat. No. 5,709,722.

Diesel soot particulate traps, which can be regenerated via electrical heating of the filter element itself, are known, e.g. from U.S. Pat. No. 5,800,790.

The presently known filter elements, suitable for electrical regeneration, have the disadvantage that most of the thermal energy, obtained by Joule effects out of electrical energy and used to heat the filter element, is lost due to thermal losses.

SUMMARY OF THE INVENTION

It was found that the losses of thermal energy is caused by 3 effects:

1. The filter medium, generating the thermal energy via Joule effects, looses thermal energy via radiation, e.g. towards the filter housing.
2. Thermal energy is lost via convection, heating the gasses which pas through the filter medium during regeneration. This effect is much larger when the strip is regenerated in stream.
3. Thermal energy is lost due to thermal conduction. E.g. when the filter medium is welded to the housing, a lot of thermal energy is transferred from the filter medium to the housing via this contact. The housing is needlessly heated by this thermal energy conducting.

It is an object of the invention to provide a filter element, to be regenerated electrically, which has a reduced thermal energy loss. Further, it is an object of the present invention to improve the contact between filter medium, being electrically regeneratable, and the housing of the filter element.

It is also an object of the invention to provide a filter unit, comprising at least two but possibly more than two filter elements, each filter element being regeneratable individually. Such a filter unit as subject of the invention may be used in a diesel exhaust filter pack for stationary diesel engines of for diesel engines, used in vehicles such as boats, trains or other motor vehicle.

Filter pack is to be understood as a filter system which is installed or used in a gas stream. It comprises a gas inlet, a gas outlet, and at least one filter unit, installed between inlet and outlet.

A filter element as subject of the invention comprises a pleated metal fiber fleece. This metal fiber fleece, preferably sintered, is pleated according to pleating lines, so providing a edge with pleat openings. The gas, to be filtered, has to flow from one side of the fleece (inflow side) to the other side of the fleece (outflow side), passing through the fleece. Appropriate pleat openings have to be closed in order to make the gas to flow through the metal fiber fleece, so preventing bypasses from gas from the inflow side to the outflow side, without passing through the metal fiber fleece.

A filter element according to the invention further comprises a filter element housing, which comprises at least two flanks, each comprising a stiff material layer. According to the present invention, at least one side of each flank is provided with thermally and electrically insulating properties, hereafter referred to as "thermally and electrically insulated side". "Stiff material" is to be understood as an inflexible material, which to a certain extend lacks suppleness or pliability and having the property of being difficult to bend, as is generally known for ceramic or metal plates.

According to the invention, the edge of the pleated metal fiber fleece is mounted between the two thermally and electrically insulated sides of the flanks in such a way that the edge makes contact with these thermally and electrically insulated sides of the flanks. The flanks exercise a clamping force on the edge of the metal fiber fleece in a direction essentially parallel to the pleating lines, meanwhile closing the pleat openings in order to prevent bypasses.

Preferably, the metal fiber fleece and the flanks provide a hollow filter volume. At least one, but preferably two flanks are provided with an aperture, which provides entrance to gasses to the inner side of the hollow filter volume. Gas, filtered or to be filtered may flow in or out of the hollow filter volume via these apertures.

An improved connection may be obtained is many different ways according to the invention.

Each flank may comprise a ceramic plate, being the stiff material layer, which comes into contact with the edge. The metal fiber fleece is clamped between those two ceramic plates. Both flanks exercise a clamping force on the edge of the metal fiber fleece in a direction essentially parallel to the pleating lines, meanwhile closing the the pleat openings in order to prevent bypasses. The ceramic plate provides thermal and electrical insulating properties to the flanks. The thickness of the ceramic plates is preferably at least 5 mm, most preferably at least 6 mm, e.g. at least 10 mm.

Preferably these ceramic plates are provided with recesses. The depth of these recesses is preferably larger than 0.5 mm, and may be in the range of 0.5 mm to 2 mm, e.g. 1.58 mm. These recesses are obtainable by providing e.g. a slot in the thermally and electrically insulating ceramic plates. These recesses correspond with the edge, in such a way that they engage closely with the edge when the pleated metal fiber fleece is mounted between the two flanks. The edge of the metal fiber fleece is sunken over a certain depth in the recesses. The part of the edge of the metal fiber fleece, sunken in the recesses is hereafter referred to as "sunken part".

It should be noted that the edge is installed in the recesses in such a way that small movements, e.g. thermal expansions or vibrations, of the pleated metal fiber fleece can be allowed. This freedom of movement is obtained by providing recesses, which are slightly deeper than the height of the sunken part of the edge in the thermally and electrically insulating side The ceramic plates are provided by using ceramic materials, e.g. based on $Al_2O_3$ and or $SiO_2$ or mica. The flank may be provided out of one material, or may comprise different layers, provided by different materials. One understands that, in case of recesses used and in case different layers are used to provide the flanks, the recesses are to be provided in layers, which are thermally and electrically insulating. To protect the ceramic plates against mechanical damages, the ceramic plates may be supported by a metal plate, being present at the other side of the ceramic plate, not contacting the metal fiber fleece. Alternatively, this metal plate may have the shape of a rim, in which the ceramic plate fits.

Less preferably, although possibly according to the present invention, the metal fiber fleece is glued to the ceramic plate using ceramic or high temperature resistant adhesive.

Alternatively, each of these flanks comprising a thermally and electrically insulating fabric and a stiff material layer. The thermally and electrically insulating fabric is present at one side of the stiff material layer, so providing a thermally and electrically insulated side to the flank. The metal fiber fleece is mounted between the thermally and electrically insulated sides of both flanks, which exercise a clamping force on the edges of the metal fiber fleece in a direction essentially parallel to the pleating lines, meanwhile closing the pleat openings in order to prevent bypasses.

For each flank, a thermally and electrically insulating fabric, e.g. a ceramic textile layer, is supported by a stiff material layer, preferably a metal or ceramic plate or rim.

The metal fiber fleece is mounted between the thermally and electrically insulated sides of both flanks, in such a way that these sides of the flanks close the pleating openings. Since the thermally and electrically insulating fabric provides the thermally and electrically insulated side, the thermally and electrically insulating fabrics make contact with the edge of the metal fiber fleece. A clamping force is exercised by the flanks on the edges of the metal fiber fleece in a direction essentially parallel to the pleating lines. Since the pleated metal fiber fleece has sufficient buckling resistance, the pleated metal fiber fleece is pressed into the thermally and electrically insulating fabric, so providing a recess over the edge of the pleated metal fiber fleece in the thermally and electrically insulating fabrics of the flanks.

The depth of the recess of the edge should at least be sufficient to prevent the pleated metal fiber fleece to move along with the gas to be filtered. This phenomenon is so called 'blow through'. The recess, being the depth over which the metal fiber fleece is presses in the thermally and electrically insulating fabric, is preferably larger than 0.5 mm, but may be in the range of 0.5 mm to 2 mm.

In the scope of the present invention, a thermally and electrically insulating fabric is to be understood as a non-woven, woven, braided or knitted textile fabric, comprise thermally and electrically insulating fibers at the surface of the fabric, which is to contact the edge of the metal fiber fleece. Most preferably, the whole fabric consist of such thermally and electrically insulating fibers, however, a combination of thermally and electrically insulating fibers at the side contacting the edge, with metal fibers at the opposite side may be used. Such thermally and electrically insulating fibers preferably are ceramic fibers, such as fibers, comprising $Al_2O_3$ and/or $SiO_2$, e.g. NEXTEL®-fibers.

The fabric thickness is preferably between 3 to 6 mm. A woven or nonwoven fabric is preferred.

When flanks comprising ceramic plates or rims, together with a thermally and electrically insulating textile fabric, are used to provide a filter element as subject of the invention, the ceramic plates or rims are obtainable by using ceramic materials, e.g. based on $Al_2O_3$ and or $SiO_2$ or mica to provide this side of the flank. When flanks comprise metal plates or rims, together with a thermally and electrically insulating textile fabric, preferably stainless steel is used to provide the metal plates or rims. The flank may be provided out of one material, or may comprise different layers, provided by different materials.

Another filter element as subject of the invention may be provided using a relatively thick layer of ceramic adhesive to connect the metal fiber fleece and a stiff material layer, preferably a metal plate or rim to each other. The adhesive is at least present over the whole length of the edge of the metal fiber fleece, but preferably, the whole surface of the side of the stiff material layer is coated with this adhesive. The metal fiber fleece is mounted between the flanks having its pleating lines preferably essentially perpendicular to the stiff material layer of the flanks. The layer of ceramic adhesive is to prevent direct contact over the total length of the edge of the metal fiber fleece, being connected to the flank. It positions the metal fiber fleece, provides the electrically and thermally insulating properties and offers a good seal between the metal fiber fleece and the stiff material layer. A thermally and electrically insulating side is so provided to the stiff material layer. The metal fiber fleece is mounted between the thermally and electrically insulated sides of both flanks provided by the adhesive. The flanks exercise a clamping force on the edges of the metal fiber fleece in a direction essentially parallel to the pleating lines. Meanwhile these flanks close the pleat openings in order to prevent bypasses.

In order to improve the adhesion between stiff material layer and ceramic adhesive, a wire mesh, an expanded or perforated metal sheet may be inserted between the surface of the stiff material layer and the edge of the metal fiber fleece. This mesh or expanded or perforated metal sheet acts so to say as anchoring points for the ceramic adhesive, and it is sunken in the adhesive layer. Best results were obtained using a metal rim and a metal mesh. The metal mesh was spot welded to the metal rim on several points.

The thickness of the adhesive layer is preferably more than 0.5 mm, and less than 2 mm. The edge of the metal fiber fleece is sunken over a certain depth in the adhesive layer, providing a so-called sunken part to the edge of the metal fiber fleece. This sunken part has a height of preferably at least 10% less than the thickness of the adhesive layer, but also preferably in the range of 0.5 mm to 2 mm.

Further, the adhesion between stiff material layer and ceramic adhesive may be obtained by first coating, e.g. spraying a layer of ceramic particles (e.g. by flame spraying of $Al_2O_3$ or $SiO_2$) on the side of the stiff material layer, before providing the ceramic adhesive to the stiff material layer. This layer also further improves the electrical insulation between metal fiber fleece and stiff material layer, which may be required in case the stiff material layer is a metal plate or rim. Such spraying may be done also on the mesh or perforated or expanded metal sheet. Possibly a ceramic layer is sprayed on the mesh or expanded or perforated sheet, after it has been spot welded to e.g. a metal rim or plate.

To further improve the ductility and the resistance to thermal cycling of the ceramic adhesive layer between the stiff material layer of the flanks, being a ceramic or a metal plate or rim, and sintered metal fiber layer, metal particles may be added to the ceramic adhesive. Metal short fibers are preferred over metal powder, since the ductility of cured ceramic adhesive is much more superior as compared to ceramic adhesive comprising metal powder. Surprisingly it was found that the electrical insulation properties of such adhesive layer were influenced only slightly, as compared to pure ceramic adhesion.

Short metal fibers preferably comprises fibers with an equivalent diameter "D" between 1 and 150 μm preferably between 2 and 100. Most preferably the diameter ranges between 2 and 50 μm or even between 2 and 35 μm such as 2, 4, 6.5, 8, 12 or 22 μm. Preferably, but not necessarily, short metal fibers have an L/D-ratio of more than 5, preferably more than 10, wherein L stands for the average length of the short metal fibers.

Preferably, the layer of ceramic adhesive comprises at least 0.5% by weight of short metal fibers, most preferably more than 10% by weight or even more than 20% by weight. Preferably the layer of ceramic adhesive comprises less than 30% by weight of short metal fibers.

A metal plate or rim is preferably provided out of stainless steel. Most preferably the metal fiber of the metal fiber fleece and the metal plate or rim are out of the same metal alloy.

Filter elements, as subject of the invention may further comprise other elements, to form, together with the flanks mentioned above, the filter element housing. These elements may also be thermally and electrically insulated, in order to reduce the thermal energy, lost due to radiation, from the metal fiber fleece to these elements or due to the heating of these elements because of contact between hot gas and housing. E.g. a perforated metal screen or a more permeable thermally insulating fabric may be applied, in order to further reduce the thermal losses due to radiation towards the adjacent filter units of the filter pack wall. In case of a more permeable thermally insulating fabric, preferably, a $SiO_2$-grid woven fabric is used.

Such filter elements as subject of the invention have several advantages.

The thermal energy loss due to conduction is prevented, since the sides of the flanks, used to close the pleat openings have thermally insulating properties. The metal fiber fleece is only in contact with the filter housing via this side. The pleating of the metal fiber fleece also causes thermal radiation, being radiated from one pleat to the adjacent pleats. Since electrical current is to be supplied only to the metal fiber fleece, in order to regenerate the fleece, the fleece is electrically insulated from the filter housing at its edge, by the electrically insulating side.

Preferably, the metal fiber fleece is to be resistant to bulging. A sintered and pleated metal fiber fleece has a rather high bulging resistance due to the pleated shape, to provide a edge.

Further, surprisingly it was found that, when a filter element as subject of the invention comprising a thermally and electrically insulating fabric is used, e.g. to filter diesel exhaust gas, loaded with soot particles, the filter element works self-sealing, even after regenerating. This is explained as follows.

The edge of the metal fiber fleece is mounted or pressed between the thermally and electrically insulating sides of the flanks.

In case a thermally and electrically insulating fabric is used, due to the textile nature of the fabric, the metal fiber fleece is recessed to a certain depth in the fabric. Under normal circumstances, this recess is sufficient to close all voids in the fabric next to the recessed part of the metal fiber fleece, so no gas can bypass the metal fiber fleece through the thermal and electrical insulating fabric. In case there is a small void in the fabric, which is not closed by the recessed part of the metal fiber fleece, small amounts of exhaust gas will bypass the metal fiber fleece via this void. The soot, being present in the exhaust gas, will be trapped by the fabric, so closing the void space. When the metal fiber fleece is now regenerated, the thermal and electrical insulating fabric will not be heated enough in order to incinerate the soot, trapped by the fabric at the void space. So the bypass of gas through the fabric is hindered after the void spaces are filled with soot, due to such bypass. The filter seals itself.

An identical effect is obtained when the edge of the pleated metal fiber fleece is mounted in a recess in the thermally and electrically insulating side of a flank, being the ceramic plate. Preferably a small void space is provided underneath the edge, to allow small movements. The recess fits that good to the sunken part of edge at the surface to the pleated metal fiber fleece, that under normal circumstances, no gas can bypass the metal fiber fleece via the sides of the edge and these voids. In case there is a small gap between the side of the edge at a sunken part and the slot, soot will be trapped and retained in these gaps. When the filter is regenerated, the soot will not be heated enough in order to incinerate this soot completely. So the bypass of gas through the gaps is hindered after the gaps are filled with soot, due to such bypass. The filter seals itself.

In the scope of the present invention, with metal fiber fleece is meant a fleece, comprising metal fibers, preferably steel fibers. The alloy of metal or steel may be chosen dependant on the temperature range which is to be withstand by the metal fiber fleece. Stainless steel fibers of AISI alloys of the 300- or 400 series, or alloys such as Inconel® are to be preferred. In case high temperatures are to be withstand during regeneration, alloys comprising Fe, Al and Cr are preferred, such as Fecralloy®. The fibers may be obtained by any presently known production method, such as bundle drawing or shaving. Fiber diameters between 1 and 100 μm are to be used, preferably between 2 and 50 μm, e.g. between 12 and 35 μm such as 12, 17 and 22 μm. preferably the fleece is sintered using appropriate sintering circumstances, according to the alloy used. Preferably, the metal fibers are obtainable by bundle drawing or coil shaving. The latter is described more in detail in WO97/04152.

Also thickness, weight per $m^2$, pore diameter and other fleece parameters may be chosen, according to the particles which are to be retained and/or the application for which the filter element is to be used.

Preferably, the metal fiber fleece used to provide the filter elements as subject of the invention, comprises different layers of metal fibers. Each fiber layer comprises fibers with a certain equivalent diameter. Best filtering results were obtained when a layer with the coarsest fibers is facing the inflow side of the filter element, whereas a layer of metal fibers with the finest fibers is facing the out-flow side of the filter. An example of such layered metal fiber fleece is a metal fiber fleece comprising a layer of metal fibers with equivalent diameter of 35 μm, and a layer of metal fibers with an equivalent diameter of 17 μm. Possibly a layer of metal fibers with equivalent diameter of 22 μm can be located between these two layers. Porosity of more than 85% is preferred, while the weight per square meter of the fleece is preferably less than 1500 $g/m^2$, e.g. 1450 $g/m^2$.

Equivalent diameter is to be understood as the diameter of a radial cut of an imaginary round fiber, having an identical surface as the radial cut of the fiber under consideration.

According to the present invention, preferably the metal fiber fleece consists of only one strip of filter media comprising metal fibers. Most preferably, this strip is rectangular. However alternatively, the metal fiber fleece may consist of more than one strip of filter media comprising metal fibers which strips are mounted between the two flanks of the filter element as subject of the invention.

Sintered metal fiber fleece has a good resistance against buckling, when put under mechanical load in a direction, parallel to the plane surface of the fleece. To improve the buckling resistance, the fleece may be corrugated using preferably repetitive undulations, with a wavelength preferably less than 5 times the thickness of the fleece. The amplitude of the corrugation is also preferably less than 5 times the thickness of the fleece. The buckling resistance may be improved more than 50% in ambient circumstances. Then the fleece is heated to more than 600° C., the buckling Improvement is still more than 30%.

The metal fiber fleece, used to provide a filter element as subject of the invention further comprise at least two but possibly more than two contact bodies, fixed, e.g. clamped on or sintered to the metal fiber fleece. According to the present invention, a contact body is a body to which the electric current is supplied by the electric circuit, in order to regenerate the filter element. This contact body divides in a proper way the electric current over the total surface of the metal fiber fleece. Preferably, these contact bodies are metal foils, e.g. Ni-foil or metal woven meshes, sintered at both ends of the metal fiber fleece.

Special care is to be taken in case the metal fiber fleece is pleated in such a way that both ends of the metal fiber fleece, each of them to be contacting one pole of the electric circuit, are located close to each other. The contact bodies are to be insulated from each other. This can be done by inserting one or more electrically insulating plates between both contact bodies, e.g. mica plates. Both contact bodies may be connected to this electrically insulating plate using bolts and nuts or alike. Preferably, the contact bodies are applied on the ends in such a way that the contact bodies extend from the metal fiber fleece in the off-stream direction of the filter element.

Filter elements as subjects of the invention are used to provide filter units. Several filter elements may be combined, e.g. stacked one on top of the other. To avoid thermal losses, the different filter elements are separated from each other by a thermally insulating layer, e.g. a thermally insulating and thermal resistant layer of textile, e.g. a woven $SiO_2$-fabric around the filter unit, a more permeable thermally insulating fabric may be applied, in order to further reduce the thermal losses due to radiation towards the adjacent filter units of the filter pack wall. Preferably, a $SiO_2$-grid woven fabric is used.

Filter elements as subject of the invention may be used to filter hot gases, such an exhaust gases from diesel internal combustion engines.

As subject of the invention a filter unit comprising filter elements is provided using filter elements with two flanks, each flank having an aperture which provides entrance for gasses to the inner side of the hollow filter volume. The filter elements are mounted over a permeable core member, e.g. a perforated metal tube, which extends through the apertures of the filter elements. Gas which is provided to the permeable core member, may enter in the inner side of the hollow filter volume. Such gas are to flow through the metal fiber fleece of the filter elements towards the outside of the filter elements. Alternatively, gas, flowing through the metal fiber fleece entering in the inner side of the hollow filter volume, may be evacuated via the permeable core member.

Several filter elements or filter units comprising filter elements as subject of the invention may be used in parallel, e.g. to be able to regenerate at least one filter element, through which no gas flows, so reducing convection heat losses, while the other filter elements continue to filter the gas stream. They may be mounted in series connection, to filter the gas stream in different steps, e.g. for different particle sizes.

Further, as another subject of the present invention, a filter system is provided comprising several filter units as subject of the invention. A filter system further comprises a valve system and an electrical control system. Temporarily, one or more filter units may be shut from the gas stream to be filtered. Hereafter referred to as "put off-line". This is done by closing and opening appropriate valves of the valve system. The closing of the valves is controlled by the electrical control system. The electric control system further controls the provision of electrical current to one or more filter elements, and possibly the temperature and pressure in the filter system. Also, if necessary, the timing of the regeneration sequences of the different filter units may be controlled by this electric control system.

So, each filter element can be regenerated individually, preferably one after the other. Alternatively, the filter element may be regenerated inline, while gas continues to flow through the filter element.

Preferably, at least one and most preferably all flanks have an aperture, e.g. a circular opening in the middle of the flank. Such apertures may be used to mount several filter elements as subject of the invention one on top of the other.

BRIEF DESCRIPTION OF THE DRAWINGS

The invention will now be described into more detail with reference to the accompanying drawings wherein

FIG. 5b shows a section according to CC' of the filter element of FIG. 5a;

FIG. 5d shows a section according to CC' of the filter element of FIG. 5c;

FIG. 6 shows schematically a side view of the contact bodies from a filter element as subject of the invention.

DESCRIPTION OF THE PREFERRED EMBODIMENTS OF THE INVENTION

Figure 1:
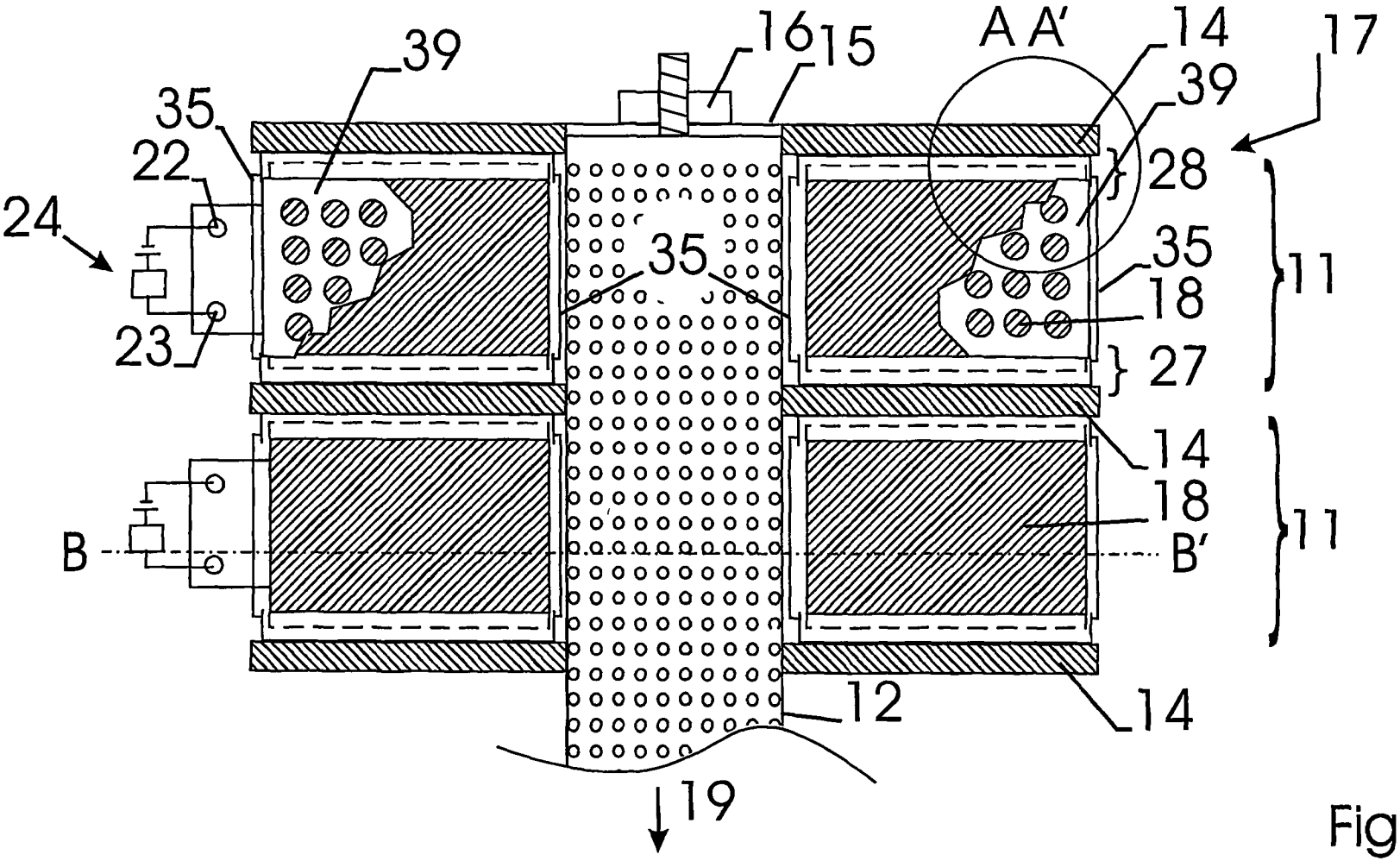
FIG. 1 shows schematically a general view of a filter unit as subject of the invention
Figure 2:
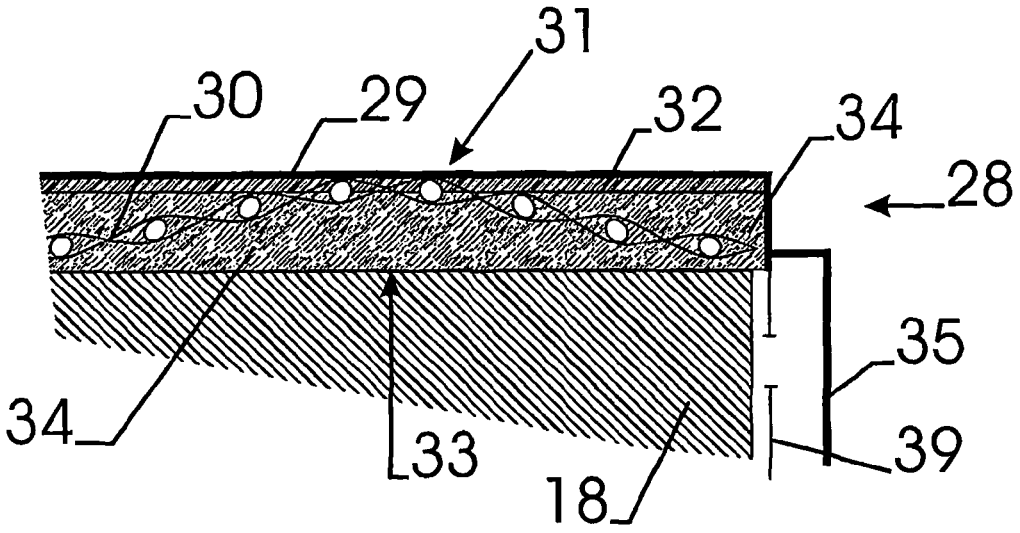
FIG. 2 shows schematically an enlarged view of part AA' of the filter unit of FIG. 1.
Figure 3:
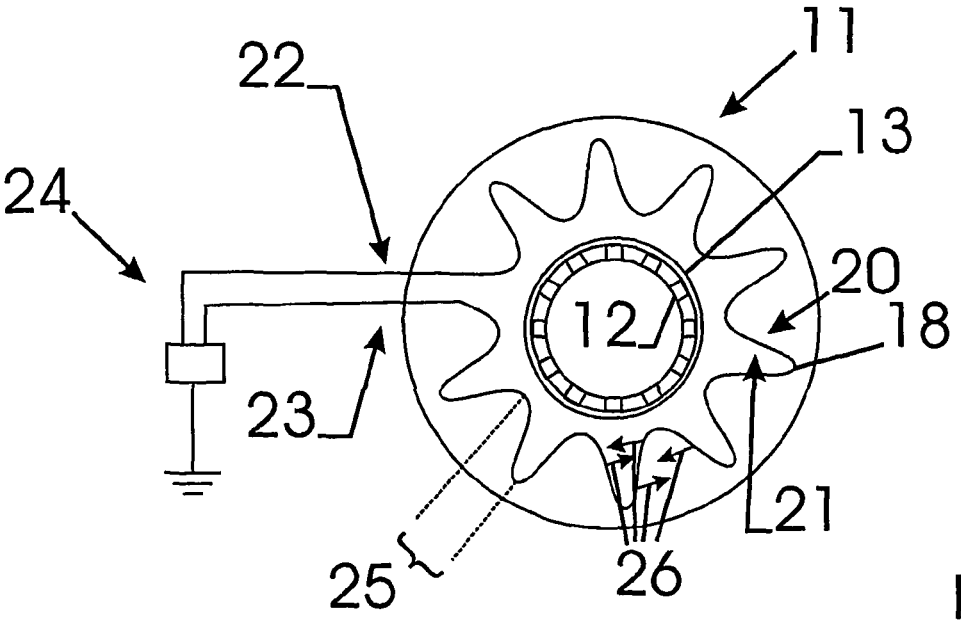
FIG. 3 shows schematically a section according to the plane BB' of the filter unit of FIG. 1.

A preferred filter unit as subject of the invention is shown in FIGS. 1, 2 and 3.

The filter unit comprises a number of filter elements 11, which are stacked one on top of the other. They all have a ring-like shape. A perforated metal tube 12 is positioned inside the inner opening 13 of the filter element. Between each filter element, a disc-like $SiO_2$ felt material 14 is positioned to thermally insulate the different filter elements from each other. At both ends of the filter unit, a metal plate 15 is fixed against the upper and lower filter element e.g. as shown in FIG. 1 by means of a screw 16, which pushes the plate towards the filter element. Between this plate 15 and the upper or lower filter element, another disc-like $SiO_2$ felt material 14 is positioned.

When this filter unit is used, preferably the gas to be filtered flows in from the outer side of the filter elements (indicated with arrow 17), through the filter medium 18 through the perforations of the metal tube 12, to the further exhaust system as indicated with arrow 19.

Taking each filter element of the present embodiment into consideration, a metal fiber fleece is used as filter medium 18. The 'dirty' gas flows in via the inflow side 20, through the metal fiber fleece, via the outflow side 21 of the metal fiber fleece to the exhaust system. The metal fiber fleece is connected via two contact bodies 22 and 23 to an electric circuit 24, providing electrical current to the metal fiber fleece in order to regenerate the dirt, e.g. soot, trapped in and on the filter medium. The metal fiber fleece is preferably pleated in such a way that the thermal radiation heat, generated by the pleats 25 during regeneration, radiates to the adjacent pleats, as indicated by arrows 26. An important reduction of electrical power is obtained using this radiation heat to propagate and support the combustion of the filtered particles The set-up of a preferred embodiment of the filter element is shown in FIG. 2. A flank 28 of the filter element comprises a metal rim 29, to which a wire mesh 30 is spot welded on several spots 31. A fine layer of ceramic material Al2O3 32 was sprayed on the electrical and thermal insulating side 33 of the flank. A relatively thick layer of ceramic adhesive 34 was applied on this mesh and the electrical and thermal insulating side 33, before the metal fiber fleece 18 was adhered to this ceramic adhesive 34, which comprises more than 10% of weight of short metal fibers.

The thickness of the adhesive layer was 2 mm and an adhesive based on ZrO2-MgO compound was used. The edge of the metal fiber fleece was sunken in the adhesive layer over a depth of 1.5 mm.

Metal plate and metal mesh were provided out of stainless steel AISI 304. Alternatively stainless steel AISI 430 was used.

Figure 4:
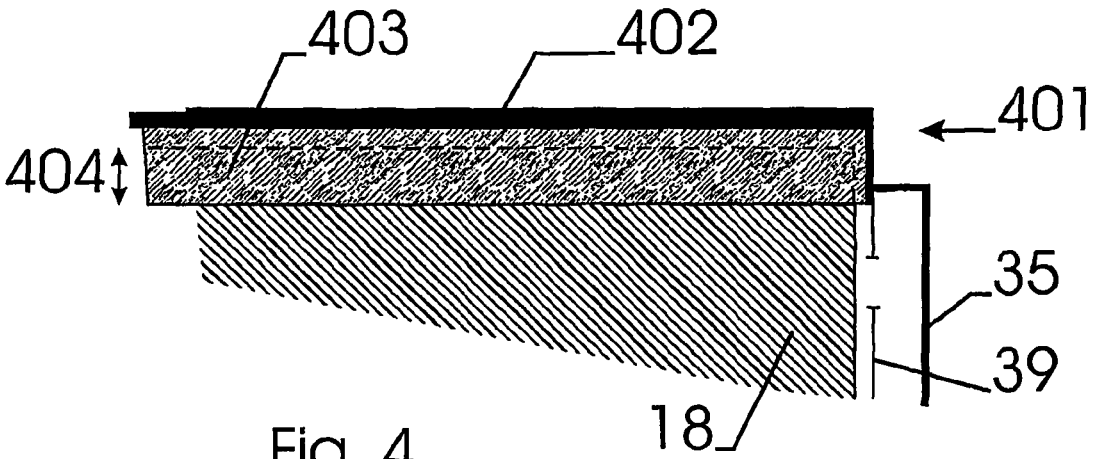
FIG. 4, FIG. 5a and FIG. 5c show a detail AA' of an alternative filter element as subject of the invention.

The set-up of a detail AA' of an alternative embodiment of the filter element is shown in FIG. 4. A flank 401 of the filter element comprises a stiff material layer 402, being a metal rim, in which an electrically and thermally insulating fabric 403 is located. This fabric 403 preferably is a $SiO_2$-feltlike material (e.g. non-woven), having a thickness of approximately 3 mm. The pleated edge of the metal fiber fleece 18 is squeezed between two electrically and thermally insulating sided of the flanks.

When mounted, the metal fiber fleece 18 is pressed in the fabric 403 over a depth 404 of approximately 1 mm. This recess avoids the blow-through of the metal fiber fleece once the filter element is in use.

Figure 5A:
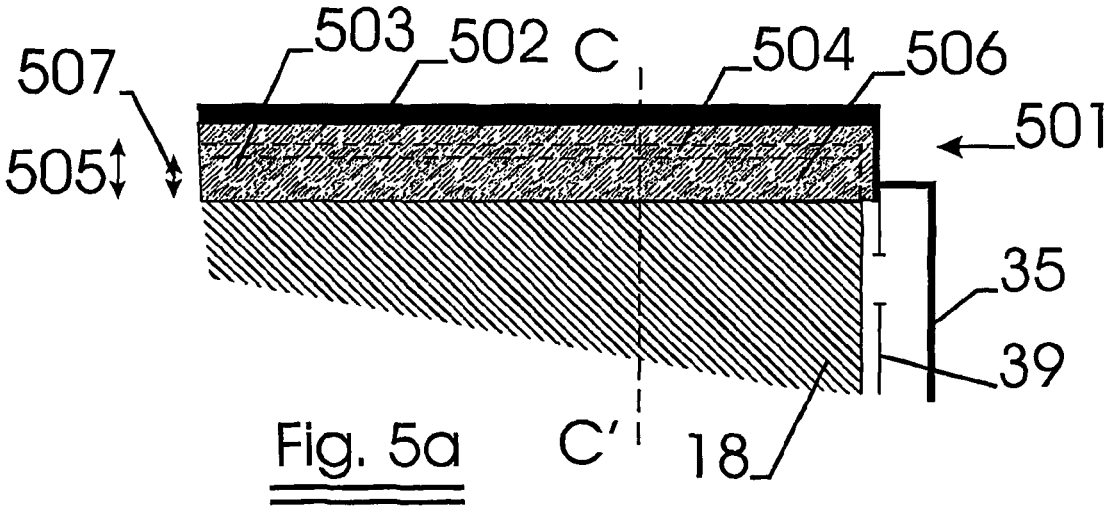
Figure 5B:
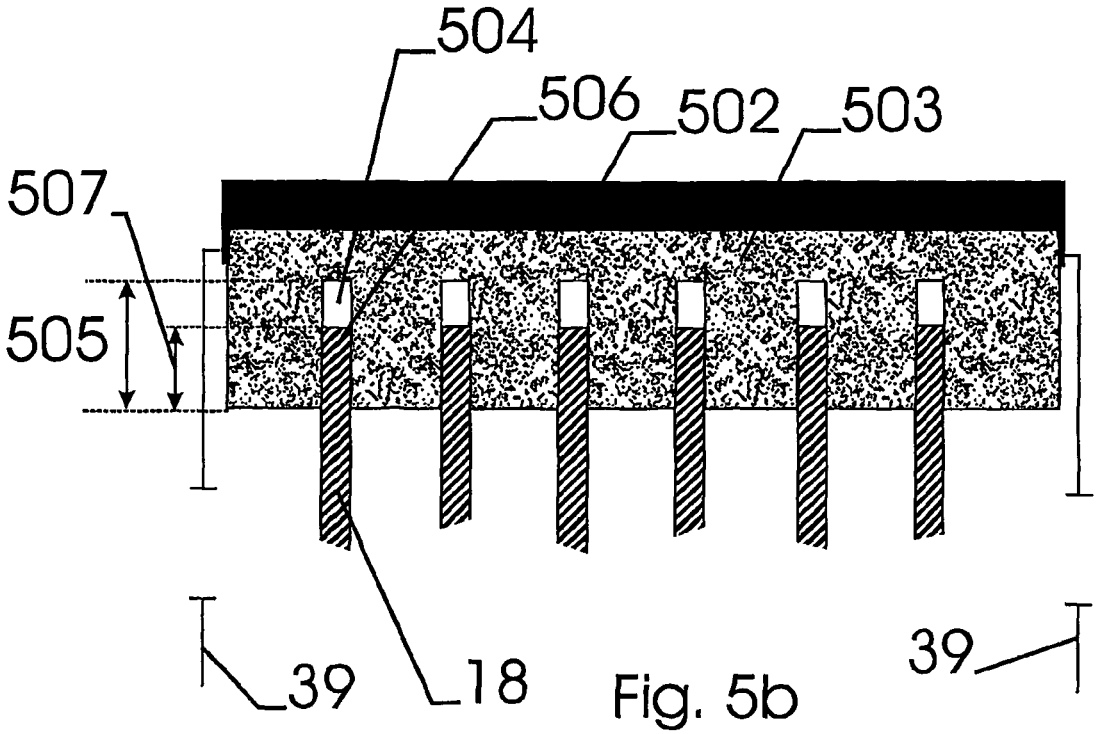
Figure 5C:
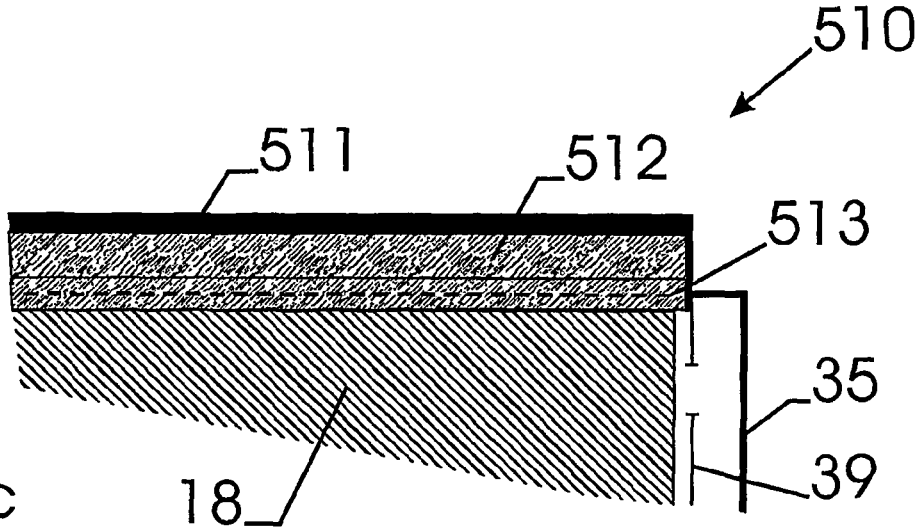

The set-up of a detail AA' of alternative embodiments of the filter element is shown in FIGS. 5a and 5c.

A detail AA' of a fist alternative embodiment is shown in FIG. 5a. A section according to the plane CC' of this embodiment is shown schematically in FIG. 5b. A flank 501 of the filter element comprises a metal rim 502, in which a ceramic plate 503 is provided. This ceramic plate is based on $Al_2O_3$-ceramic material or $SiO_2$-material and has a thickness of approximately 6 mm. The ceramic plate 503 is provided with a recess 504 having a depth 505 of 2 mm. The edge of metal fiber fleece 18 is sunken into the recess 504, so providing a sunken part 506 to the edge of metal fiber fleece 18 having a height 507 of approximately 1.5 mm.

A detail AA' of a second alternative embodiment is shown in FIG. 5c.

A section according to the plane CC' of this embodiment is shown schematically in FIG. 5d.

A flank 510 of the filter element comprises a metal rim 511, in which a ceramic plate 512 is provided. This ceramic plate is based on Al2O3-ceramic material or $SiO_2$-material and has a thickness of approximately 6 mm. At the inner side of the ceramic plate 512, which is to make contact with the metal fiber fleece 18, ceramic glue 513 is provided. The edge of metal fiber fleece 18 is sunken into the glue 513. This relatively thick layer of ceramic adhesive 513 based on $ZrO_2$-MgO compound, comprises more than 10% of weight of short metal fibers, preferably being stainless steel fibers having an equivalent diameter of 22 μm.

To improve the resistance to the mechanical tension, due to the fixation of the different elements on top of each other by screw 16, several studs 35 may be welded to the upper and lower rim of each filter element. As shown in FIG. 1, FIG. 2, FIG. 4, FIG. 5a, FIG. 5b, FIG. 5c and FIG. 5d, around the filter element 11, a perforated metal plate 39 may be present (as only shown partially in the Figures for the sake of clarity).

Figure 7:
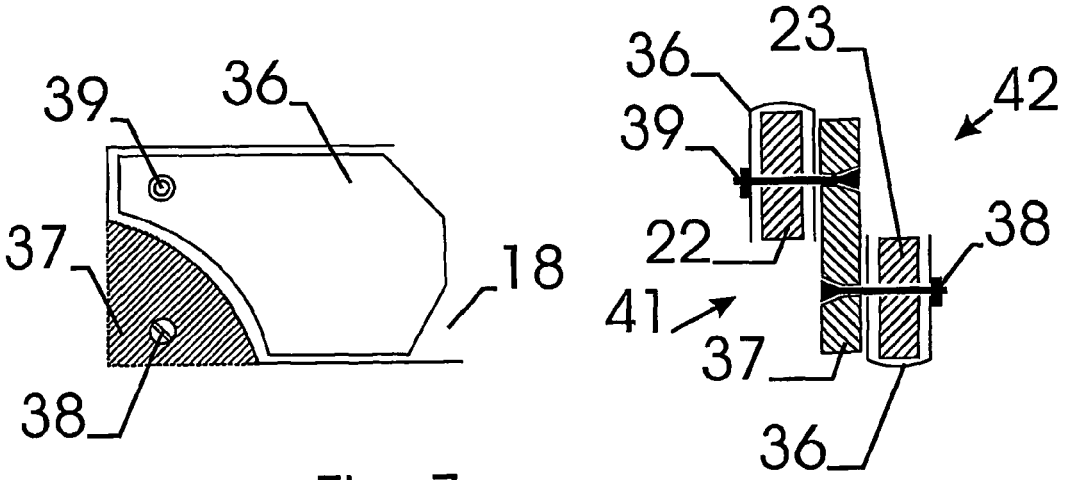
FIG. 7 shows schematically a view of alternative contact bodies from a filter element as subject of the invention.

Turning now to the contact bodies 22 and 23 of the preferred embodiment as shown in FIG. 6 and FIG. 7, a fine Ni-sheet 36 was sintered to the ends of the metal fiber fleece. Both contact bodies were brought together and fixed to an insulating plate 37, e.g. a mica-plate by means of two bolts 38 and 39. In order to avoid electrical contact between contact body 22 and bolt 38, and between contact body 23 and bolt 39, two mica sheets 40 were inserted between the insulating plate 37 and the contact bodies 22 and 23.

An alternative set-up is shown in FIG. 7. An identical set-up as in FIG. 6 is used, but the contact body 22 is shaped in such a way that no material of this contact body 22 is present at behind bolt 38, fixing the contact body 23 to the insulating plate 37. Identically, the contact body 23 is shaped in such a way that no material of this contact body 23 is present at behind bolt 39, fixing the contact body 22 to the insulating plate 37. Using such contact bodies, the use of two mica plates 40 may be avoided, which may simplify the construction of the filter element.

Figure 8:
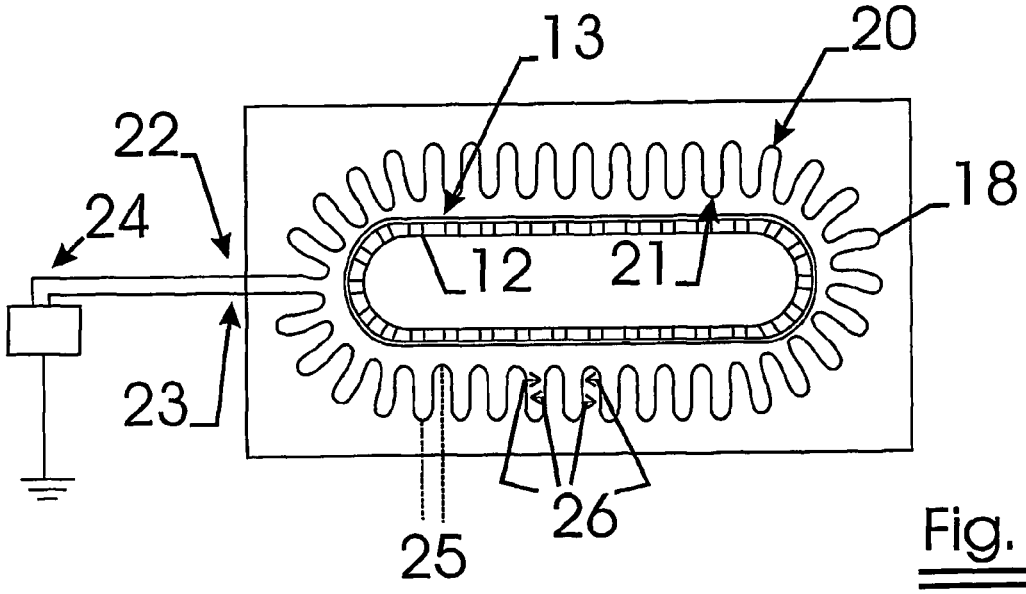
FIG. 8, FIG. 9 and FIG. 10 show schematically a section according to the plane BB' of an alternative embodiment of a filter unit as subject of the invention.

An alternative cut according to BB' is shown in FIG. 8. The perforated tube in this embodiment has an elliptic section. Also here, the metal fiber fleece is pleated according to pleating lines, which enables radiation from one pleat to another during regeneration.

Figure 9:
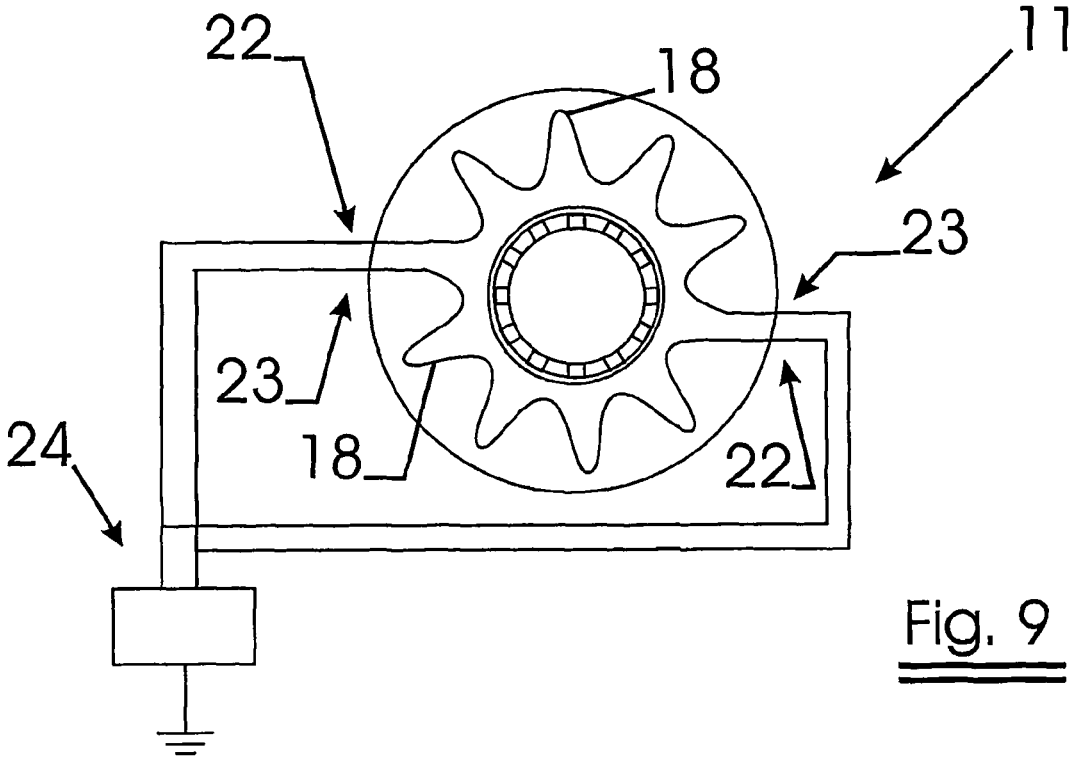

Another alternative cross section of a filter element as subject of the invention is shown in FIG. 9. The filter element in this embodiment comprises two metal fiber fleece strips, which together form the whole filter media of the filter element. Both metal fiber fleece strips have two contact bodies (22 and 23), at one end each, which are connected to an appropriate electric circuit 24.

Figure 10:
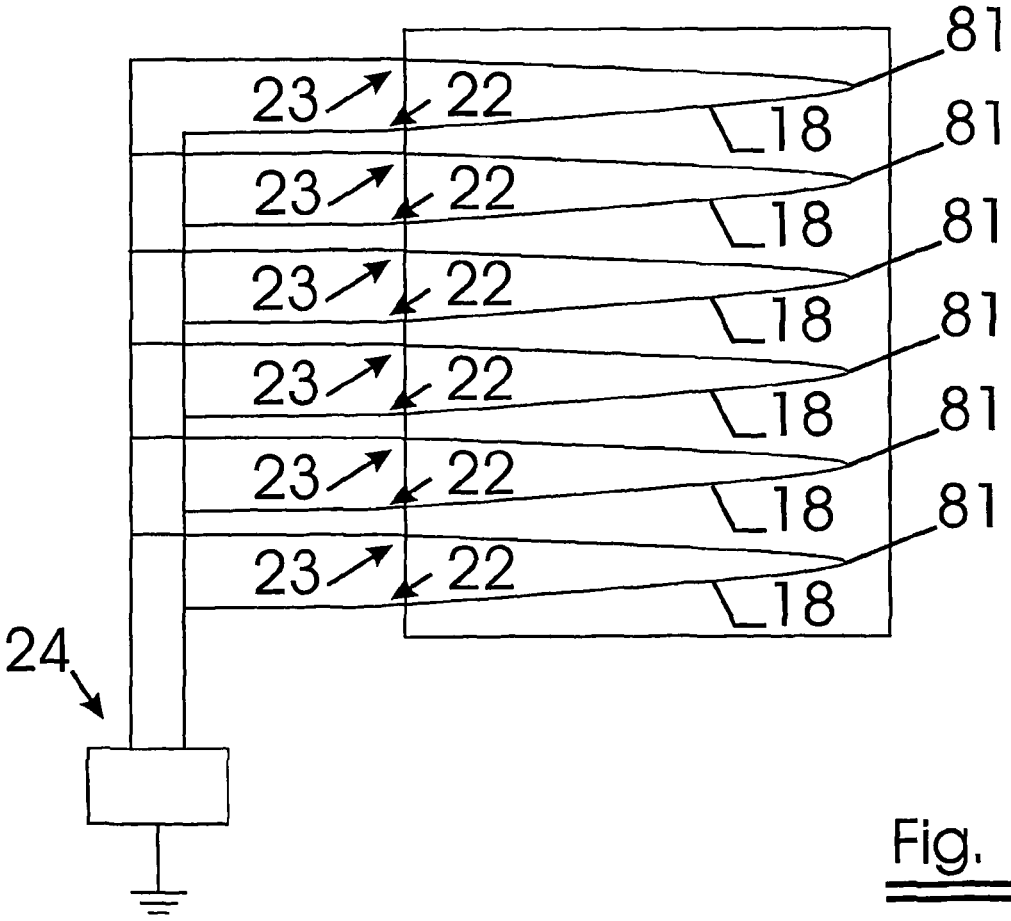

Another alternative cross section of a filter element as subject of the invention is shown in FIG. 10. The filter element comprises a set of metal fiber fleece strips, each being pleated over one pleating line 81. All strips are mounted side by side. Each metal fiber fleece strip has two contact bodies (22 and 23), one at each end of the strip. The contact bodies are lined up and connected to an appropriate electric circuit 24.

Figure 11:
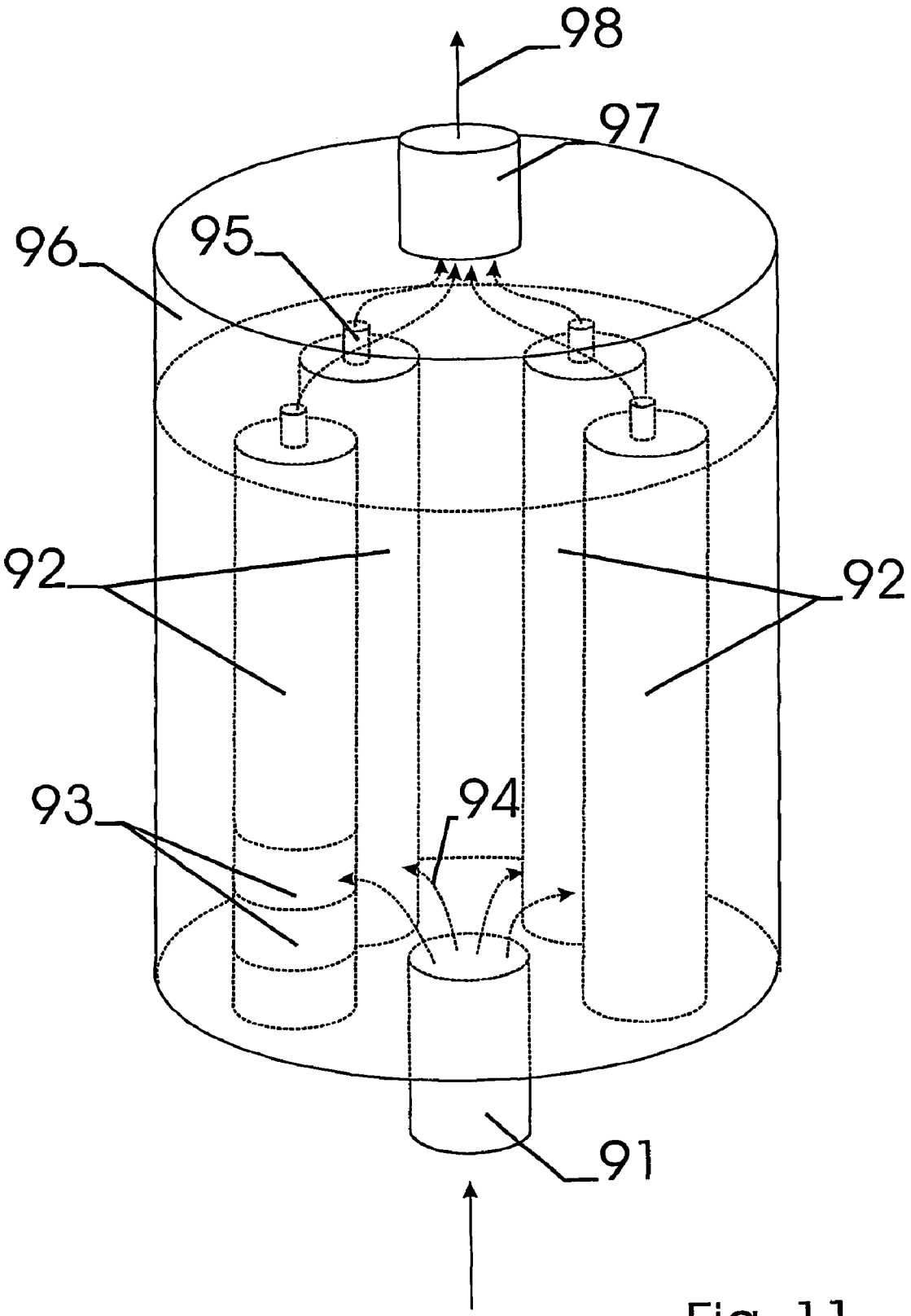
FIG. 11 shows a diesel exhaust filter system in a muffler-like shape, comprising different filter units as subject of the invention.

As shown in FIG. 11, gas to be filtered may enter into a muffler system, via inlet 91. Several filter units 92, each comprising several filter elements 93 are present in the muffler-like system. The gas to be filtered goes, as indicated with arrow 94, through the filter media of each filter element and leaves the filter unit 92 via the perforated tube 95 in a collecting chamber 96. Via an outlet 97, the filtered exhaust gas flows further through the exhaust system as indicated with arrow 98.

As filter medium, a sintered metal fiber fleece comprising three layers of stainless steel fibers is used. A first layer comprises 600 g/m$^2$ of Fecralloy® fibers with equivalent diameter of 17 μm. A second layer of Fecralloy® fibers is applied on top of the first layer. This layer comprises 250 g/m$^2$ of fibers with equivalent diameter of 22 μm. A third layer of Fecralloy® fibers is applied on top of the second layer, having fibers with equivalent diameter of 35 μm. This third layer comprises 600 g/m$^2$ fibers.

A soot retention of 91% was obtained, using a stainless steel fleece, having a porosity of 85%.

The length of the metal fiber fleece in the above described embodiments is preferably 1200 mm, while the hight of the metal fiber fleece strip is preferably between 30 and 35 mm, e.g. 33.75 mm.

The soot was so-called depth filtered. This is to be understood as the fact that soot particles were trapped through the whole depth of the filter.

Only 1 minute per element was needed to regenerate the filter unit, while consuming only 750 W to 1500 W The pressure drop over the filter element was set to 100 mbar before regeneration.

The invention claimed is:

1. An electrically regeneratable filter element, comprising at least two flanks comprising a stiff material layer and at least one thermally and electrically insulated side, said filter element comprising a metal fiber fleece being pleated according to pleating lines providing an edge with pleat openings, such that said metal fiber fleece is mounted between said flanks, said thermally and electrically insulated sides making contact with said edge, said thermally and electrically insulated sides closing said pleat openings, said metal fiber fleece comprising at least one metal fiber strip, each metal fiber strip having two ends, a contact body being fixed to each of said ends of said metal fiber strip, said contact bodies being brought together and being electrically insulated one from the other by an electrically insulating plate, said electrically insulating plate being inserted between said contact bodies.

2. An electrically regeneratable filter element as in claim 1, at least one of said flanks having an aperture, said metal fiber fleece and flanks providing a hollow filter volume, said aperture providing entrance for gasses to to the inside of said hollow filter volume.

3. An electrically regeneratable filter element as in claim 2, all of said flanks having an aperture.

4. An electrically regeneratable filter element as in claim 1, wherein said flanks exercise a clamping force to said metal fiber fleece in a direction essentially parallel to said pleating lines.

5. An electrically regeneratable filter element as in claim 1, wherein each of said flanks comprises a thermally and electrically insulating fabric and a stiff material layer, said thermally and electrically insulating fabric being present at one side of said stiff material layer, providing a thermally and electrically insulated side to said flank.

6. An electrically regeneratable filter element as in claim 1, wherein each of said flanks comprises a ceramic plate, said metal fiber fleece being mounted between said ceramic plates of both flanks.

7. An electrically regeneratable filter element as in claim 1, each of said flanks comprising a stiff material layer, said stiff material layer and said metal fiber fleece being connected using a layer of ceramic adhesive, said layer of ceramic adhesive preventing direct contact of said metal fiber fleece over the length of said edge of said metal fiber fleece with said flank.

8. A filter unit comprising electrically regeneratable filter elements as in claim 1, said filter unit comprising a permeable core member extending through apertures of said flanks of said filter elements.

9. A filter unit as in claim 8, said filter elements being thermally insulated from each other.

10. A filter unit as in claim 8, said permeable core member being a perforated metal tube.

11. A filter system comprising at least one filter unit as in claim 8, said filter system comprising a valve system and an electronic control system, said electronic control system controlling opening and closing of said valve system and said electronic control system controlling the provision of electric current to said filter elements of said filter units of said filter system.

12. A filter system as in claim 11, said filter system comprising at least two filter units, said valve system putting one filter unit off-line, said electric current being provided to at least one filter element of said filter unit which is put off-line.

13. A filter element as in claim 1, wherein said contact bodies are fixed to said electrically insulating plate.

14. A filter element as in claim 13, wherein said contact bodies are fixed to said electrically insulating plate by means of bolts and nuts.

15. A filter element as in claim 14, wherein mica sheets are provided for avoiding electrical contact between contact bodies and bolts.

16. A filter element as in claim 1, wherein the contact bodies are nickel sheets.

17. A filter element as in claim 1, wherein nickel sheets are sintered to the ends of the metal fiber fleeces for providing the contact bodies.

18. A filter element as in claim 1, wherein said electrically insulating plate is a mica plate.

* * * * *